US008744516B2

(12) United States Patent
Gurevich (10) Patent No.: US 8,744,516 B2
(45) Date of Patent: Jun. 3, 2014

(54) GENERIC CLIENT FOR COMMUNICATION DEVICES

(75) Inventor: David Gurevich, San Mateo, CA (US)

(73) Assignee: SRI International, Menlo Park, CA (US)

(*) Notice: Subject to any disclaimer, the term of this patent is extended or adjusted under 35 U.S.C. 154(b) by 2705 days.

(21) Appl. No.: 11/015,096

(22) Filed: Dec. 16, 2004

(65) Prior Publication Data

US 2005/0174962 A1  Aug. 11, 2005
US 2006/0013159 A2  Jan. 19, 2006

Related U.S. Application Data

(60) Provisional application No. 60/542,644, filed on Feb. 5, 2004.

(51) Int. Cl.
*H04M 1/00* (2006.01)

(52) U.S. Cl.
USPC .................................................. 455/552.1

(58) Field of Classification Search
USPC .................................................. 455/552.1
See application file for complete search history.

(56) References Cited

U.S. PATENT DOCUMENTS

| | | | | |
|---|---|---|---|---|
| 5,960,365 | A * | 9/1999 | Leih et al. ................... | 455/552.1 |
| 6,373,952 | B2 | 4/2002 | Asano et al. | |
| 6,404,739 | B1 | 6/2002 | Gonno | |
| 6,845,091 | B2 | 1/2005 | Ogier et al. | |
| 2002/0058504 | A1* | 5/2002 | Stanforth ...................... | 455/426 |
| 2003/0054818 | A1* | 3/2003 | Bahl et al. .................... | 455/432 |
| 2003/0064752 | A1 | 4/2003 | Adachi et al. | |
| 2003/0202486 | A1 | 10/2003 | Anton, Jr. et al. | |
| 2005/0165916 | A1* | 7/2005 | Cromer et al. ................ | 709/220 |
| 2005/0174962 | A1 | 8/2005 | Gurevich | |
| 2005/0174972 | A1 | 8/2005 | Boynton | |
| 2005/0175009 | A1 | 8/2005 | Bauer | |
| 2006/0013159 | A2 | 1/2006 | Gurevich | |
| 2006/0013169 | A2 | 1/2006 | Boynton | |
| 2006/0029074 | A2 | 2/2006 | Bauer | |

OTHER PUBLICATIONS

Session Directory Tool, http://www-mice.cs.ucl.ac.uk/multimedia/software/sdr/index.html, pp. 1-2.
Postel, J., "User Datagram Protocol", RFC 768, Aug. 28, 1980.
Postel, J., "Transmission Control Protocol", RFC 793, Sep. 1981.
Mockapetris, P., "Domain names—concepts and facilities", RFC 1034, Nov. 1, 1987.
Mockapetris, P., "Domain names—implementation and specification", RFC 1035, Nov. 1, 1987.
Mills, D.L., Network Time Protocol (Version 3): Specification, Implementation and Analysis, RFC 1305, Mar. 1992.
Drom, R., "Dynamic Host Configuration Protocol", RFC 2131, Mar. 1997.

(Continued)

*Primary Examiner* — Joel Ajayi
(74) *Attorney, Agent, or Firm* — Marger Johnson & McCollom PC (57) ABSTRACT

A Generic Client (GC) operates multiple virtual network interfaces that communicate simultaneously to different networks. Each virtual interface is capable of independent communication over an associated network through the same physical interface. In one implementation, the GC provides simultaneous communication with both infrastructure and ad-hoc networks in compliance with the IEEE 802.11 protocol. The GC provides these dual modes of operation by instantiating different infrastructure and ad-hoc virtual interfaces.

12 Claims, 9 Drawing Sheets

(56) References Cited

OTHER PUBLICATIONS

"Medium Access Control (MAC) and Physical (PHY) Specification, Chapter 5 General Description", pp. 9-28, ANSI/IEEE Std. 802.11, 1999 Edition.
"Medium Access Control (MAC) and Physical (PHY) Specification, Chapter 7 Frame Formats", pp. 34-58, ANSI/IEEE Std. 802.11, 1999 Edition.
ANSI/IEEE Std. 802.11-1999, IEEE Standard for Information Technology, Part 11: Wireless LAN Medium Access Control (MAC) and Physical Layer (PHY) specifications.
Aboba, B., et al., "PPP EAP TLS Authentication Protocol", RFC 2716, Oct. 1999.
Handley, M. et al., "The Reliable Multicast Design Space for Bulk Data Transfer", RFC 2887, Aug. 2000.
IEEE Std. 802.1X-2001, IEEE Standard for Local and Metropolitan Area Networks—Port-Based Network Access Control.
Whetten, B., "Reliable Multicast Transport Building Blocks for One-To-Many Bulk-Data Transfer", RFC 3048, Jan. 2001.
Speakman, T. et al., "PGM Reliable Transport Protocol Specification", RFC 3208, Dec. 2001.
Palekar, A., et al., "Protected EAP Protocol (PEAP)", Internet draft draft-josefsson-pppext-eap-tls-eap-06.txt, Mar. 2003.
Perkins, C., el al., "Ad hoc On-Demand Distance Vector (AODV) Routing", RFC 3561, Jul. 2003.
Congdon, P., et al., "IEEE 802.1X Remote Authentication Dial in User Service (RADIUS) Usage Guidelines", RFC 3580 Sep. 2003.
De Couto, D., et al., "A High-Throughput Path Metric for Multi-Hop Wireless Routing", ACM MobiCom '03, San Francisco, California, Sep. 2003.
Clausen, T., et al., "Optimized Link Stale Routing Protocol (OLSR)", RFC 3626, Oct. 2003.
Ogier, R., et al., "Topology Dissemination Based on Reverse-Path Forwarding (TBRPF)", RFC 3684, Feb. 2004.
Johnson, David et al., "The Dynamic Source Routing Protocol for Mobile Ad Hoc Networks (DSR)", draft-ietf-manet-dsr-10, Rice University, Jul. 19, 2004.
Adamson, B., et al., "Negative-Acknowledgment (NACK)—Oriented Reliable Multicast (NORM) Building Blocks", RFC 3941, Nov. 2004.
Adamson, B. et al., "Negative-Acknowledgment (NACK)—Oriented Reliable Multicast (NORM) Protocol", RFC 3940, Nov. 2004.
IEEE Std. 802.11i-2004, IEEE Standard for Information Technology, Part 11: Wireless LAN Medium Access Control (MAC) and Physical Layer (PHY) specifications, Amendment 6: Medium Access Control (MAC) Security Enhancements.
"An Explanation of the Automatic Metric Feature for Internet Protocol Routes", Microsoft Knowledge Base Article, Article No. 29950.
"Enable NTP Time Server" (Windows 2000/XP), http://www.winguides.com/registry/display.php/1117/. Last updated Jul. 19, 2002.
Terms and Definitions for 802.11s doc.: IEEE 802.11-04/1477r4.
IEEE 802.11 TGs Functional Requirements and Scope doc.: IEEE 802.11-04/1174r13.
IEEE 802.11 TGs Comparison Categories and Informative Checklists doc.: IEEE 802.11-04/1175r10.
Oliveira, Carlos A.S., et al., "A Survey of Combinatorial Optimization Problems in Multicast Routing", pp. 1-40, Preprint submitted to Elsevier Science Dec. 3, 2003.

* cited by examiner

GENERIC CLIENT FOR COMMUNICATION DEVICES

This application claims priority from U.S. Provisional Application Ser. No. 60/542,644, filed Feb. 5, 2004.

BACKGROUND

The Institute of Electrical and Electronic Engineers (IEEE) 802.11 wireless communication standard defines two main modes of operation: Infrastructure and ad-hoc. The infrastructure mode assumes that there is an Access Point (AP) which enables clients, also called stations (STA), to connect to a wired network. The ad-hoc mode, on the other hand, mainly concerns itself with wireless peer-to-peer connections among clients. In the infrastructure mode all clients connect to the AP and send their messages through it. In the ad-hoc mode the clients send messages directly to each other. There is a third Wireless Distribution System (WDS) communication scheme that enables APs to send wireless messages to each other.

According to the 802.11 standard, a client that needs to send data to an access point in the infrastructure mode first goes through authentication and association. A client that needs to send data to another client in the ad-hoc mode may go through authentication, but authentication is not required. The 802.11 standard does not specify the precise mechanism for establishing WDS connections. Once the infrastructure, ad-hoc or WDS connections are established, data messages, such as 802.11 frames, may be sent.

Figure 1:
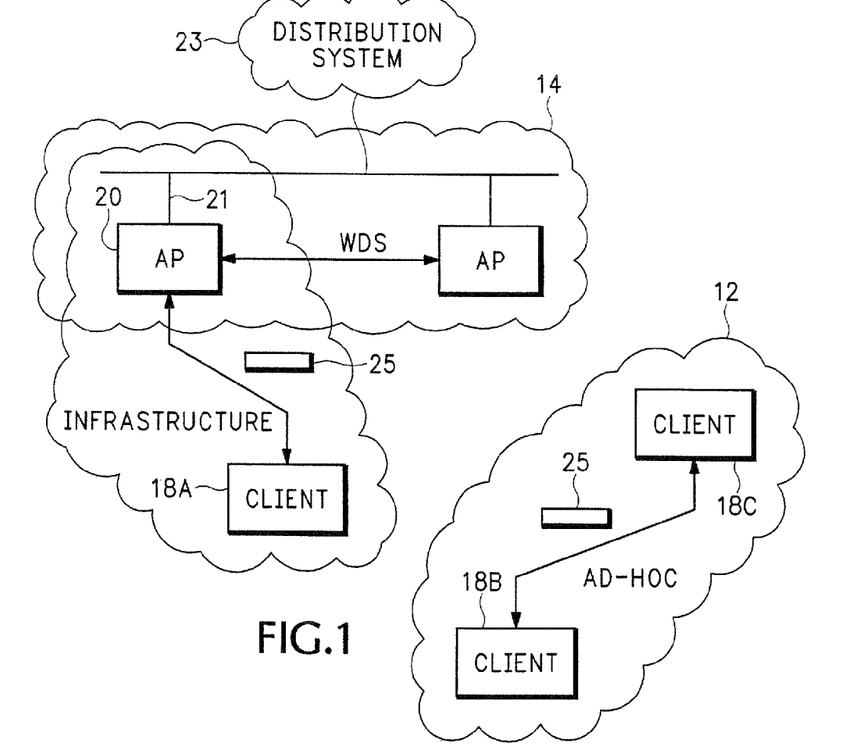
FIG. 1 is a diagram showing a prior art wireless communication system with mutually exclusive operation to infrastructure and ad-hoc networks.

Table 1.0 and FIG. 1 show how the header in a 802.11 protocol frame 25 identifies the direction of frames 25. The mechanism consists of two bits: a "From DS bit" and a "To DS bit". A Distribution System (DS) 23 can be any communication network used for transporting information to or from a client. For example, a Wide Area Network (WAN), Local Area Network (LAN), packet switched, circuit switched or any other type of wired or wireless network.

In FIG. 1, an access point 20 is connected to a wired LAN 21 that provides access to the DS 23. When the protocol frame 25 is sent from a client 18 to the AP 20 in the infrastructure mode 14, the To DS bit is set to 0 and the From DS bit is set to 1. When the AP 20 sends a frame 25 back to the client 18, the From DS bit is set to 0 and the To DS bit is set to 1. In the ad-hoc mode 12, when clients 18 send frames to each other, the From DS bit is set to 0 and the To DS bit is set to 0. In the WDS mode, the From DS bit is set to 1 and the To DS bit is set to 1.

This is documented in the IEEE 802.11 spec and shown in table 1.0 below.

TABLE 1.0

| To DS | From DS | Address 1 | Address 2 | Address 3 | Address 4 | Meaning |
|---|---|---|---|---|---|---|
| 0 | 0 | DA | SA | BSSID | N/A | STA to STA data frame |
| 0 | 1 | DA | BSSID | SA | N/A | Data frame to DS |
| 1 | 0 | BSSID | SA | DA | N/A | Data frame from DS |
| 1 | 1 | RA | TA | DA | SA | AP to AP WDS data |

The setting of the To DS and From DS bits also determine how addresses are used. The 802.11 frames sent between the client 18 and the AP 20 in the infrastructure mode use A3 (3 address) frames. The 802.11 frames sent between the client 18 and another client 18 in the ad-hoc mode are also A3 frames. The frames sent between one AP 20 and another AP 20 in the WDS are A4 (4 address) frames.

The contents of the address fields are determined by the direction of the sent frame 25. The DA is the destination address and the SA is the sender address. The BSSID is the Basic Service Set ID in the infrastructure mode. The BSSID is the Independent Basic Service Set ID (or IBSSID) in the ad-hoc mode. The RA is the receiver address and TA is the transmitter address.

In the A3 frame, the DA is equivalent to the RA and the SA is equivalent to the TA. This is because A3 frames are sent over a single hop link. The A4 frames are sent over multiple hops and the RA and TA change hop by hop where the DA and SA do not. Thus, the WDS connections support layer 2 forwarding.

The protocol message formats (headers and addressing) are important to the operation of the system as a whole because they are used by Media Access Control (MAC) firmware and software for filtering received messages. With broadcast media, the MAC layer determines which messages are processed and which are discarded. Thus, the header settings have to be set correctly in order to implement a meshing system architecture with existing hardware and firmware.

The infrastructure mode 14 and the ad-hoc mode 12 are mutually exclusive. A client 18 cannot operate in the infrastructure mode 14 and the ad-hoc mode 11 at the same time. Thus, client 18A operating in the infrastructure mode 14 cannot communicate with the client 18B or 18C operating in the ad-hoc mode 12. Similarly, clients 18B and 18C operating in the ad-hoc mode 12 cannot communicate to client 18A operating in the infrastructure mode 14 or the DS 23 via the AP 20.

This presents a problem for networks where messages need to be sent to any type of AP or client any time they are within range. The present invention addresses this and other problems associated with the prior art.

SUMMARY OF THE INVENTION

A Generic Client (GC) operates multiple virtual network interfaces that communicate simultaneously to different networks. Each virtual interface is capable of independent communication over an associated network through the same physical interface. In one implementation, the GC provides simultaneous communication with both infrastructure and ad-hoc networks in compliance with the IEEE 802.11 protocol. The GC provides these dual modes of operation by instantiating different infrastructure and ad-hoc virtual interfaces.

The foregoing and other objects, features and advantages of the invention will become more readily apparent from the following detailed description of a preferred embodiment of the invention which proceeds with reference to the accompanying drawings.

DETAILED DESCRIPTION

The system described below is applicable to any communication system that needs to operate with more than one network or operate in more than one communication mode at the same time. The particular set of examples described below use 802.11 local area networks. However, this should only be considered as an example of the wide variety of different networks that may use the communication system. For example, the communication system can be used for any wired or wireless network where multiple virtual interfaces can be instantiated and operated at the same time.

Generic Client

Figure 2:
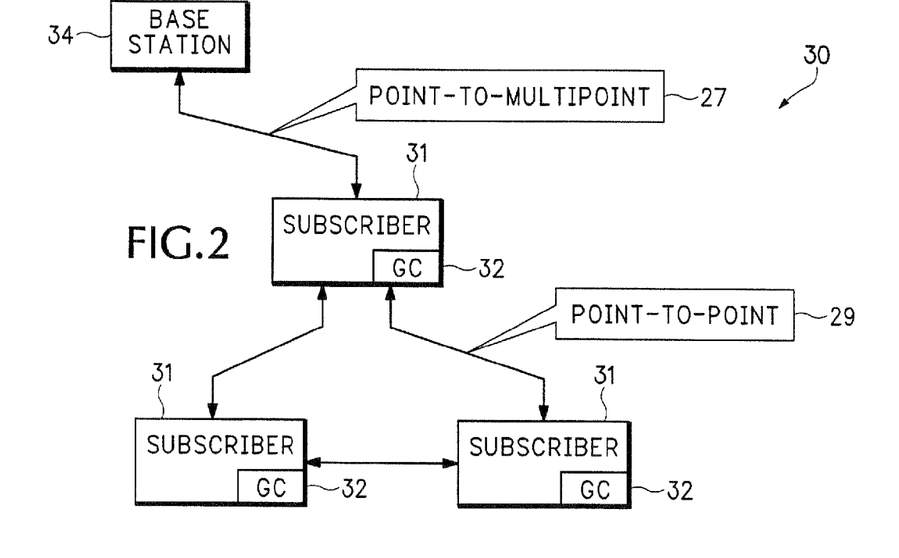
FIG. 2 is a block diagram showing how a Generic Client (GC) can communicate using both point-to-point and point-to-multipoint communication modes at the same time.

Referring to FIG. 2, a wireless communications system 30 may define specific functionality and roles above the physical transceiver level (also known as layer 1, or PHY). These roles define the behavior of the link layer protocol (layer 2, or MAC).

In a centralized configuration, a typical cellular architecture, an infrastructure wireless Local Area Network (LAN), or point-to-multipoint Local Multipoint Distribution Services (LMDS), or an 802.16 access network, one side of the link implements a base station controller 34 and the other a subscriber or a client 31. In an 802.11 ad-hoc configuration, or a point-to-point wireless bridge, or a push-to-talk LMR system, the link endpoints constitute peers at the physical and link layers. Frequently the equipment used to implement the system in a particular mode depends on the configuration.

A generic client 32 is incorporated into one or more subscribers 31 and supports multiple modes of simultaneous operation. This enables the subscriber nodes 31 to act in a more flexible and dynamic way. The subscriber nodes 31 can take advantage of new network topologies (such as mesh), increased capacity, frequency reuse, and range extension as conditions allow without switching mode of operation or reconfiguration. This can be accomplished with a software or hardware implementation and is not limited to any particular radio technology or spectrum.

The generic client 32 allows the subscriber nodes 31 in wireless network 30 to communicate with other subscriber nodes 31 in a point-to-point communication scheme 29. The subscriber nodes 31 can also communicate with other subscribers 31 through the base station 34 using a point-to-multipoint communication scheme 27.

Figure 3:
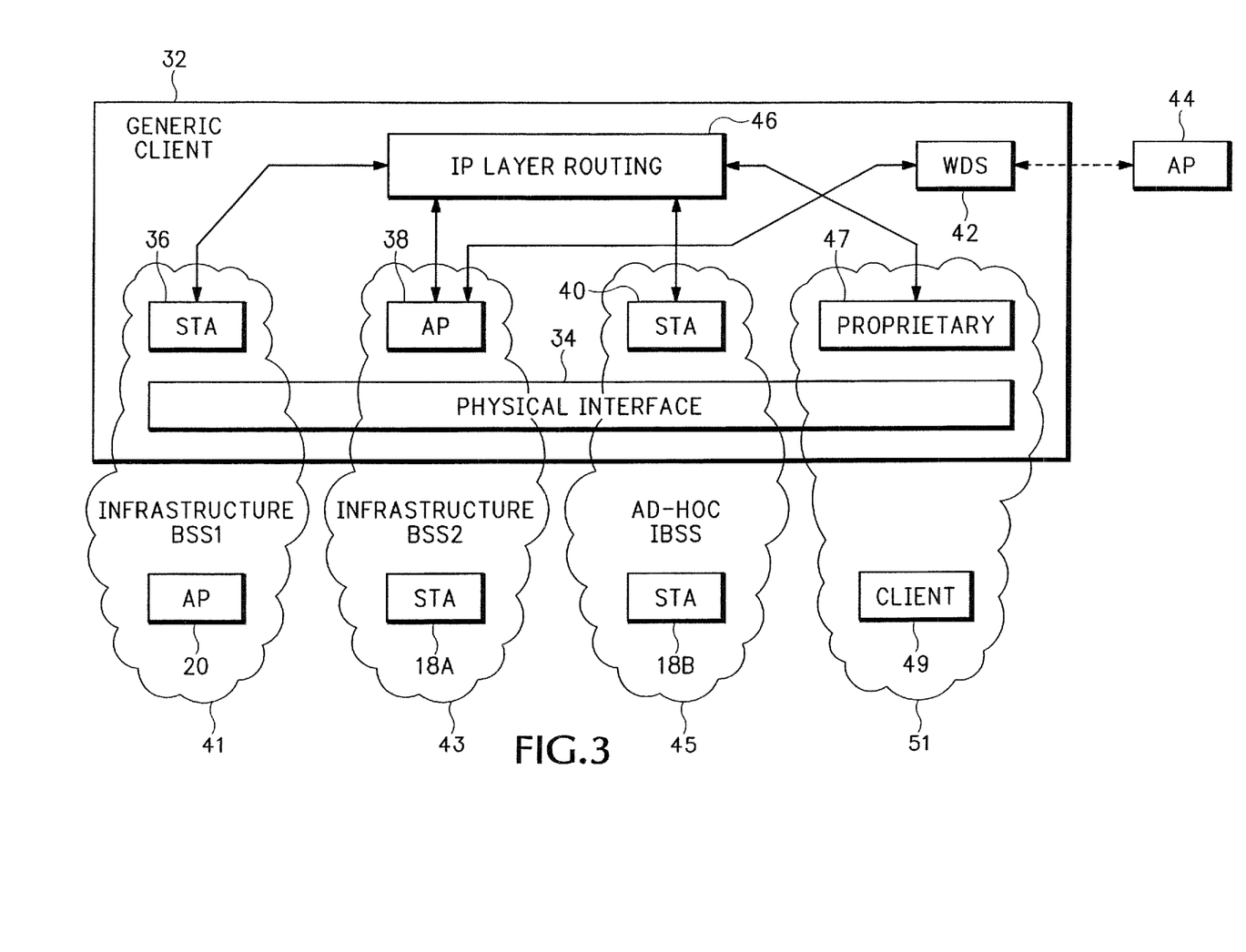
FIG. 3 is a block diagram showing how the GC instantiates multiple virtual interfaces.

In FIG. 3, a single physical layer (L1) interface 34, such as a wireless radio, is used to gain access to a wireless media. A software driver implements Media Access Control (MAC) functionality at layer-2 (L2) of the Open System Interconnect (OSI) standard to instantiate multiple simultaneous virtual network interfaces 36, 38, 40 and 42. The Generic Client (GC) 32 simultaneously operates the multiple active logical interfaces 36-42 and in one example uses a 803.11 transceiver in radio 34 for communicating using the 802.11 protocol.

A Station (STA) infrastructure virtual interface 36 is configured to operate like a STA (client) for communicating with an AP 20 in an 802.11 wireless infrastructure network 41. An Access Point (AP) infrastructure virtual interface 38 is configured to operate like an AP for communicating in an 802.11 infrastructure communication network 43 with clients or STAs 18A. A STA ad-hoc virtual interface 40 is configured to operate as a STA for communicating in an 802.11 ad-hoc communication network 45 directly with other clients or STAs 18B.

This enables the GC 32 to interoperate with an infrastructure AP 20, ad-hoc STA's 18B, and provide an AP service to infrastructure STA's 18A at the same time. The GC 32 can also support a virtual Wireless Distribution System (WDS) interface 42 that provides communication between virtual AP 38 and other APs 44.

In one embodiment, the multi-mode (multiple personality) interfaces 36-42 are not bridged at layer 2. Alternatively, message forwarding and routing is implemented by layer 3 routing 46 of the Open System Interconnect (OSI) standard. This allows all of the L2 interfaces 36-42 to operate simultaneously using the same PHY interface 34.

The GC 32 determines which one of the virtual interfaces 36, 38, or 40 to use for communicating with the APs 20 and STAs 18A and 18B according to the "From DS bit" and the "To DS bit" in frame headers. The Basic Service Set IDs (BSSIDs) in the frames then uniquely identify different wireless sessions.

Ad-Hoc Network 45

In one implementation, A3 frames as described in table 1.0 are used to communicate in the ad-hoc network 45. The virtual interface 40 sets the From DS and To DS bits to 0 in the frame header. The STAs 18B then operate on the same IBSS in ad-hoc network 45. The association is not required between STAs before sending data. An authentication step is optional. Broadcast destination addresses are allowed and used for discovery. This is compliant with the 802.11 standard. This therefore supports standard STAs 18B operating in the 802.11 ad-hoc mode. Because there is a common network interface there are no implications for the upper layer protocols like IP and IP routing.

Infrastructure Networks 41 and 43

In infrastructure networks 41 and 43, the A3 frames shown in table 1.0 are used to communicate. The From DS and To DS bits are set according to the destination/source of the frame. All of the STAs or clients 18A operate on the same BSS network. Normally association is required for this mode. If the association is used, this implies that one side of the link functions as an AP and the other side as a STA. However, it is possible that no association is used.

The To DS bit, From DS bit, and addresses are set accordingly on every frame. Broadcast destination addresses are used for discovery. Aside from the frame header format, the infrastructure virtual interfaces 36 and 38 may be similar to the ad-hoc virtual interface 40. Because there is a common network interface there are no implications for the upper layer protocols like IP and IP routing.

WDS Network 42

In the WDS network, the A4 frames shown in table 1.0 might be used to communicate. The From DS and To DS bits and the addresses are set according to table 1.0. In AP to AP WDS, all 4 address fields in table 1.0 are used. Because forwarding is not being performed at layer 2, the Address 3 and Address 4 fields are redundant. Broadcast addresses are also redundant because the WDS links can only be set up with the knowledge of the addresses on both sides of the link. This is arguably a standard compliant mode. Even though the 802.11 standard does not specify the use of the WDS in a STA, it does not preclude it either. The STAs in the WDS mode have the capability of setting up WDS links to other access points 44.

The WDS mode 42 has significant implications on the upper layer protocols, particularly IP routing. The WDS link abstraction is a network interface. Unlike the ad-hoc or infrastructure networks, a separate sub-network interface is created for every link.

This is accomplished either manually or statically or dynamically. The manual configuration is done with prior knowledge of the hardware address of the remote client. The dynamic configuration works by listening for 802.11 beacon frames from the remote client. The beacon frame contains the hardware address. Upon receiving the frame, a WDS link can be set up and a network interface instantiated.

In another embodiment, the GC 32 can also support other proprietary virtual network interfaces 47. A proprietary network 51 can communicate over the same physical interface 34 used for the 802.11 networks 41, 43 and 45. However, the proprietary network 51 may not follow, or only partially follow, the 802.11 protocol. For example, proprietary network 51 may include additional security or encryption operations that are not supported in 802.11. The CG 32 can communicate with a client 49 over the proprietary network 51 using the same physical interface 34 used for the 802.11 infrastructure and ad-hoc networks 41, 43 and 45.

Figure 4:
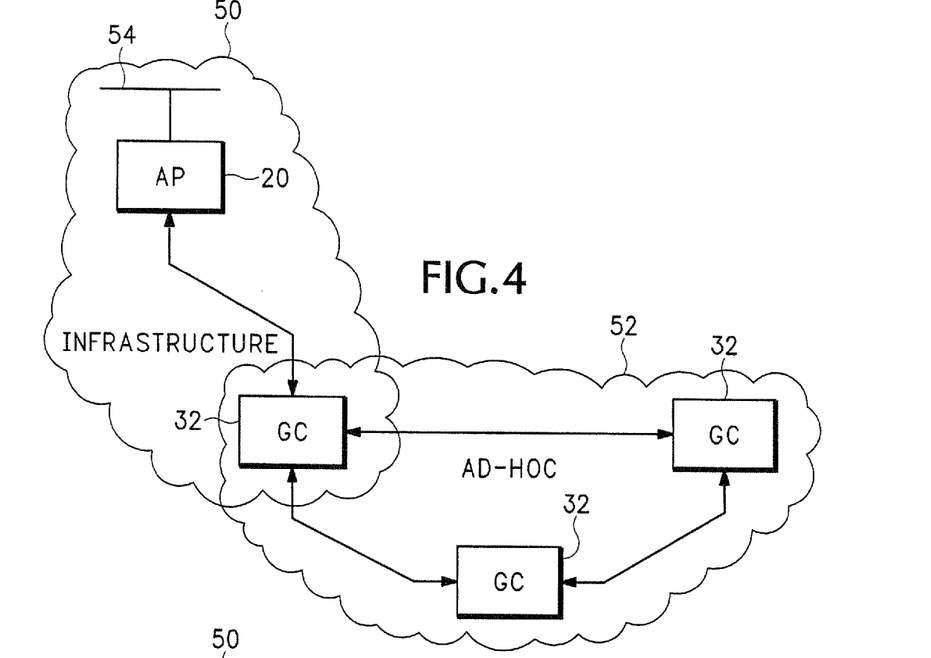
FIG. 4 is a diagram showing the GC communicating with both a infrastructure network and an ad-hoc network at the same time.

FIG. 4 shows how the GC 32 can communicate with an AP 20 over an infrastructure network 50 and at the same time communicate with one or more GCs 32 and/or non-generic standard clients (STAs) over an ad-hoc network 52. The GC 32 instantiates a STA MAC service interface 36 (FIG. 3) that communicates with the infrastructure AP 20. At the same time the GC 32 can instantiate an ad-hoc STA interface 40 (FIG. 3) for communicating directly with other ad-hoc clients. One or more of the GCs 32 may also instantiate an AP infrastructure interface 38. This allows the GCs 32 to act as a layer 3 gateway to the infrastructure AP 20 or to other clients.

The infrastructure AP 20 may be connected to a wide variety of external networks 54 including wired or wireless networks, Wide Area Network (WANs), Local Area Networks (LANs), packet switched networks, circuit switched networks or any other type of wired or wireless communication system used for transporting information.

Transparent Range Extension

Figure 5:
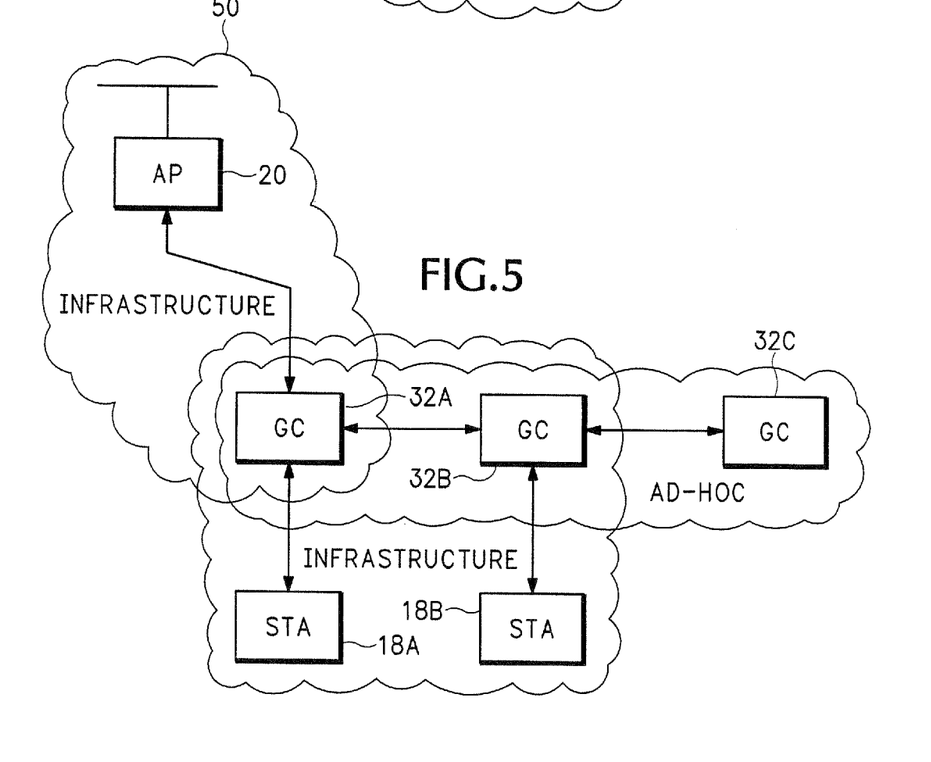
FIG. 5 shows how the GC can extend a wireless network by operating as a virtual Access Point (AP).

FIG. 5 shows how the GC 32 can expand client functionality and range by operating as a bridge. The GC 32 can act as a virtual AP that communicates with another GCs 32, STAs 18, and APs 20. For example, the GC 32A can instantiate an infrastructure STA virtual interface 36 (FIG. 3) and an infrastructure AP virtual interface 38 (FIG. 3).

The AP interface 38 in GC 32A sets its BSSID the same way as the upstream AP 20. Any infrastructure STA, such as STA 18A in FIG. 5, then communicates with the virtual AP interface 38 in the GC 32A. The GC 32A implements layer 3 forwarding 46 (FIG. 3) using conventional routing protocols to forward the data from STA 18A to the virtual STA interface 36 that communicates with upstream AP 20. Thus, the wireless network in FIG. 5 is extended by allowing STA 18A to communicate with AP 20 through GC 32A.

In yet another example, STA 18A may be out of communication range for ad-hoc communication with STA 18B or infrastructure communication with AP 20. The STA 18A can still communicate with STA 18B in an infrastructure mode through an AP virtual interface 38 located in GC 32A and/or GC 32B. Thus, the overall range of the wireless network in FIG. 5 is extended over convention 802.11 networks.

Figure 6:
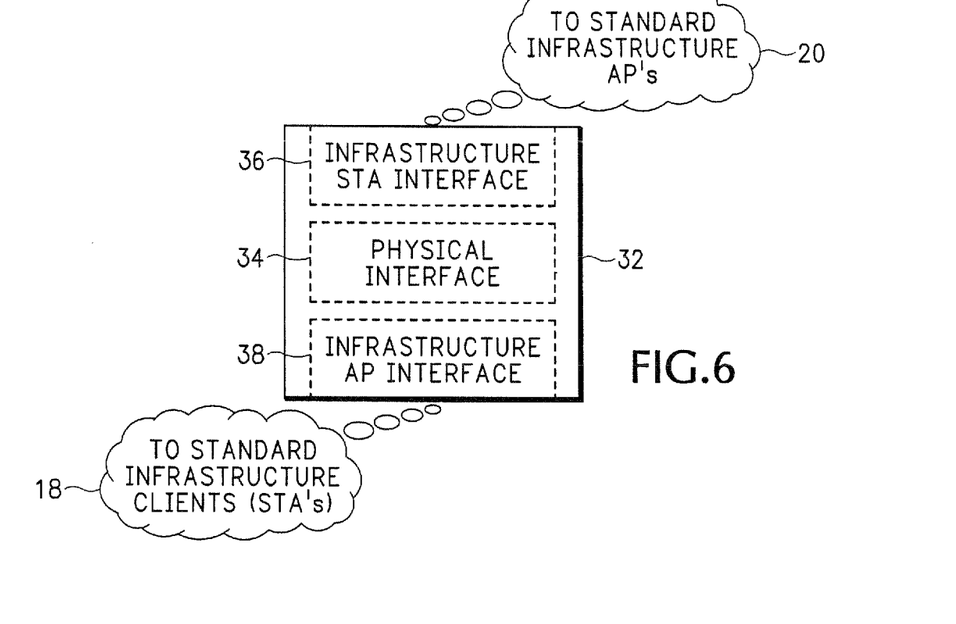
FIG. 6 shows an infrastructure STA and infrastructure AP interface in the GC.

In FIG. 6, the infrastructure STA interface 36 allows the GC 32 to appear as a standard infrastructure STA to "upstream" APs 20. Therefore, GC 32 does not impact the configuration or basic capabilities, and can work with, standard 802.11 APs 20. Similarly, the infrastructure AP interface 38 allows the GC 32 to appear as a standard infrastructure AP to "downstream" clients 18. Therefore, the GC 32 also does not impact the configuration or basic capabilities of conventional 802.11 clients or STAs 18. It should also be noted that the STA interface 36 and the AP interface 38 can operate simultaneously using the same hardware interface 34.

Figure 7A:
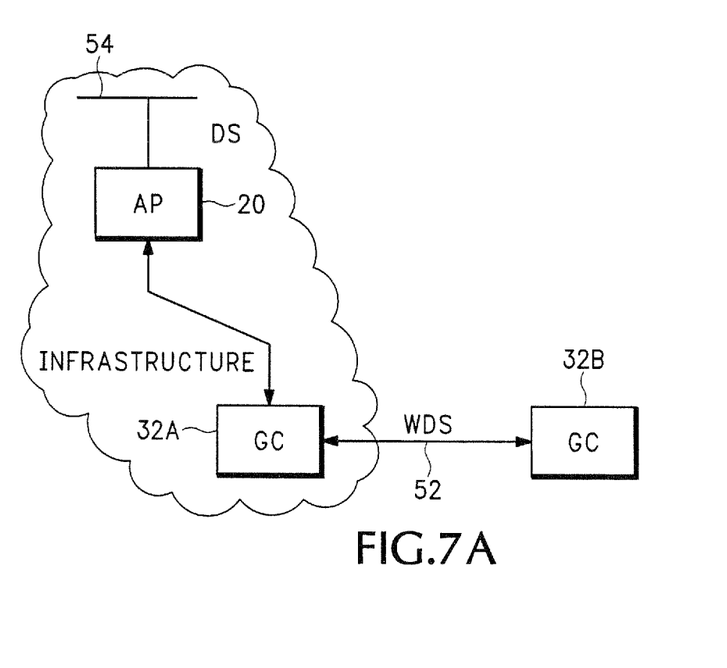
FIGS. 7A and 7B show how the GC operates as a bridge between two APs.
Figure 7B:
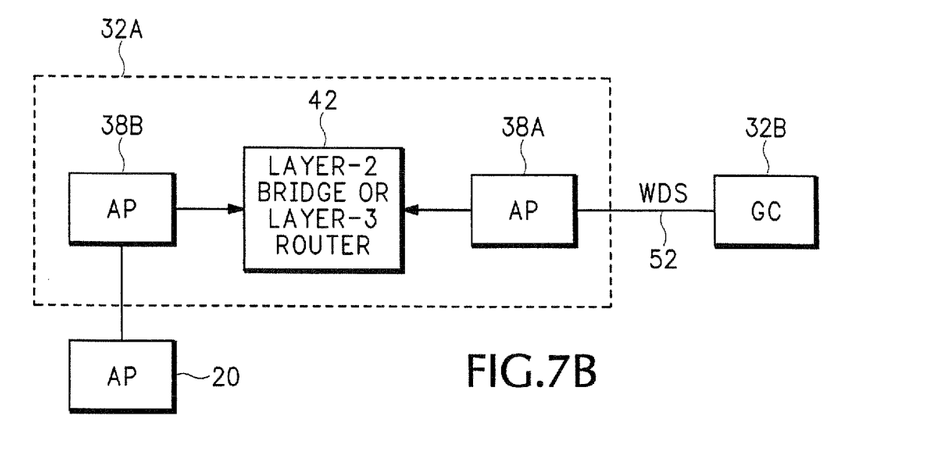

FIG. 7 describes in more detail how a WDS link 52 is used as a meshing backbone. A layer 2 bridge network 42 is created on one or more GCs 32 that allow a client to use the WDS link 52 as defined in the 802.11 standard for communication between infrastructure APs (acting as a virtual AP) and coordinate with a layer 3 routing protocol for routing across the layer-2 bridge.

The WDS link 52 is typically used as a layer 2 forwarding architecture between AP's. It can also be used as a backbone for an IP routable mesh. However, in the generic client scenario, the configured point-to-point links between two clients can be used for sending WDS frames. Forwarding of the frames to another AP can then be done at layer 2 or layer 3. When layer 2 forwarding is used, static or dynamic bridging functionality 42 is used. Alternatively, layer 2 bridging may also be combined with layer 3 routing.

For example, the GC 32A may include a first virtual AP infrastructure interface 38A that communicates with the GC 32B over the wireless WDS link 52. Layer-2 bridge or layer 3 router software 53 then routes the frames to another virtual AP interface 42 that communicates with the AP 20.

Figure 8:
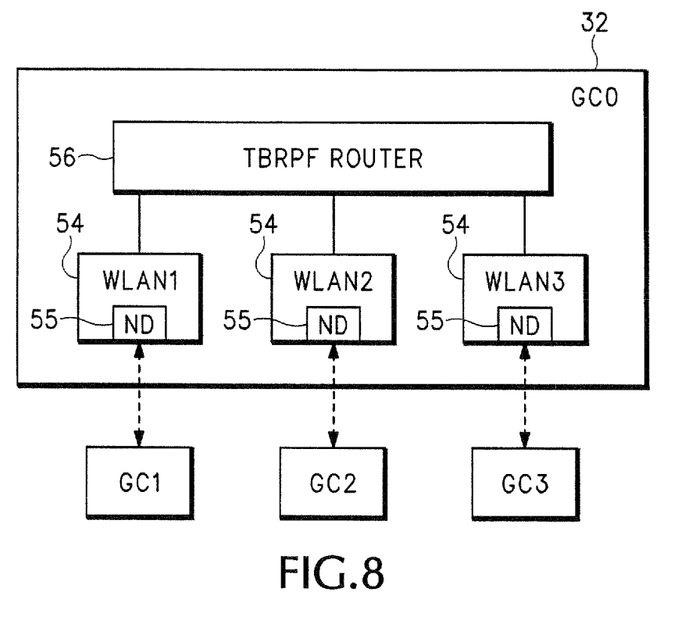
FIG. 8 shows how the virtual interfaces in the GC can be used for neighbor discovery.

FIG. 8 shows how wireless neighbor discovery 55 can be performed in the virtual network interfaces 54. Individual layer-2 logical interfaces 54 provide additional neighbor discovery 55 to a network layer (layer-3) router 56. Most ad hoc network protocols use a network layer (layer-3) neighbor discovery protocol. Layer-2 neighbor discovery 55 is more efficient in a wireless network.

The 802.11 specification provides for link layer neighbor discovery 55. This is done via beacon frame broadcasts. The beacon frame contains the hardware (MAC) address of the sending network node that GC0 uses to instantiate a network interface 54 for every neighbor node (GC1-GC3). This has the advantage of leveraging the underlying wireless link layer (layer-2) efficiencies. A Topology Broadcast based on Reverse-Path Forwarding (TBRPF) router 56 therefore only needs to be aware of the virtual point-to-point links 54.

Both the initial discovery and the on-going link maintenance (status) can be supported with no layer 3 overhead (additional messaging). As any of neighbor GC's 1, 2 or 3 come into range of GC 0 and move out of range, the link status information is immediately translated into instantiation and removal of corresponding virtual interfaces 54.

Figure 9:
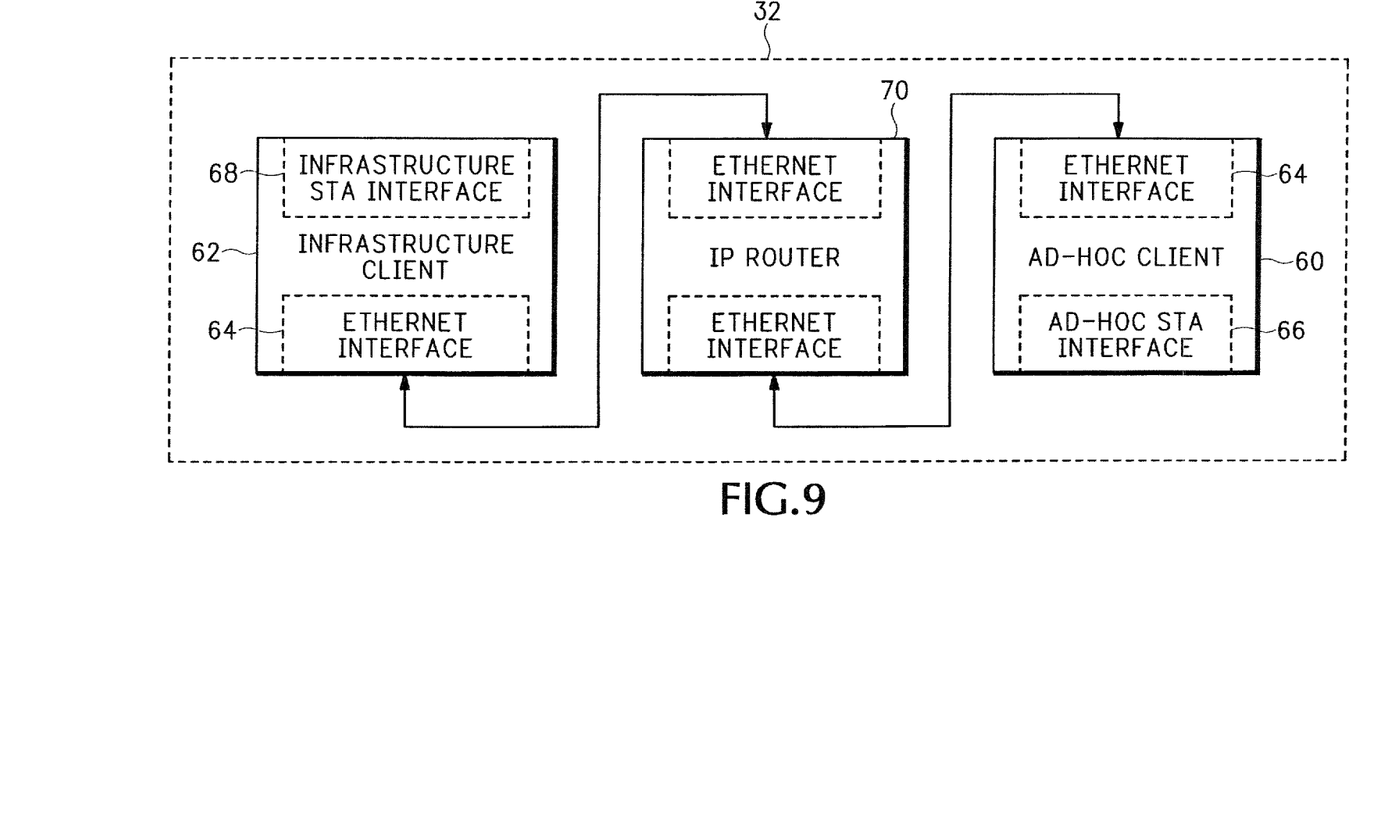
FIG. 9 is an abstraction showing functionally how the GC operates.

FIG. 9 shows one way of envisioning the generic client 32. Imagine two distinct clients 60 and 62 connected together via wired Ethernet interfaces 64. The infrastructure client 62 communicates with access points and the ad-hoc client 60 communicates point-to-point with other clients. Wireless interfaces 66 and 68 are not connected at layer 2 and the messages (802.11 frames) are not forwarded directly from one interface to the other. There is no linkage between the two interfaces 66 and 68 at all. This is functionally equivalent to connecting the clients 60 and 62 via Ethernet through an IP router 70.

Figure 10:
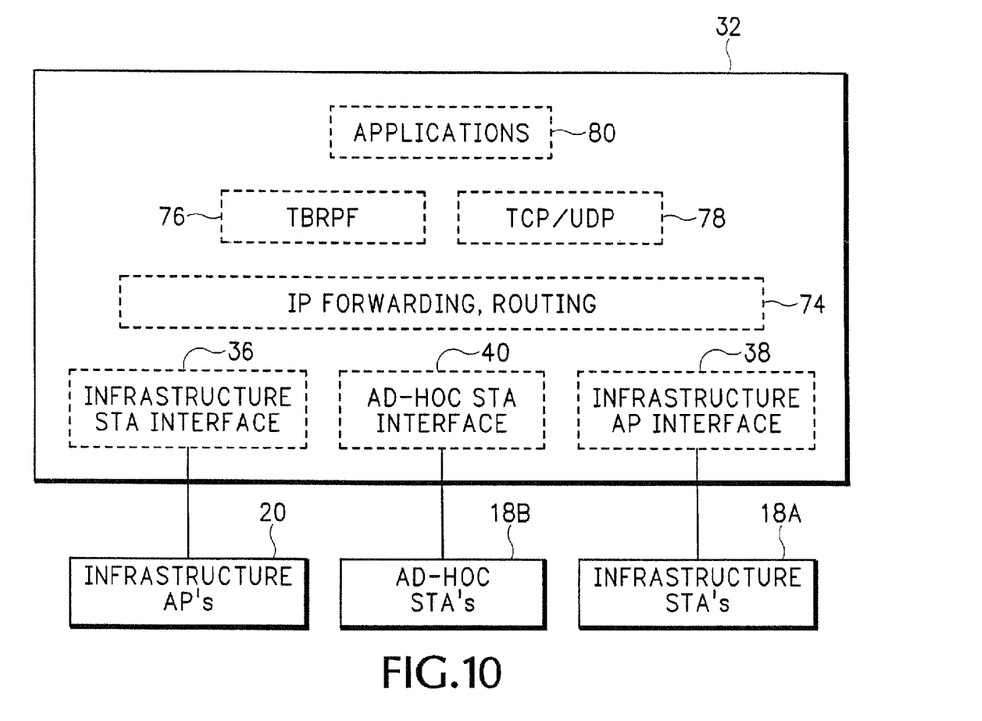
FIG. 10 is a diagram showing the different operational layers in the platform operating the GC.

FIG. 10 shows one example of how the generic client 32 treats the infrastructure APs 20, the meshed ad-hoc clients 18B, and the standard infrastructure clients 18A as logically separate sub-networks accessible via distinct virtual interfaces 36, 38, and 40, respectively. This has the advantage of being able to use standard upper layer tools for routing and forwarding decisions. For example, a conventional IP layer 2 and layer 3 forwarding and routing 74 can be used in addition to conventional neighbor discovery protocols such as TBRPF 76 and conventional TCP/UDP protocols 78. Any other conventional applications 80 cal also be implemented in the generic client 32.

Virtual Interface Mapping

Figure 11:
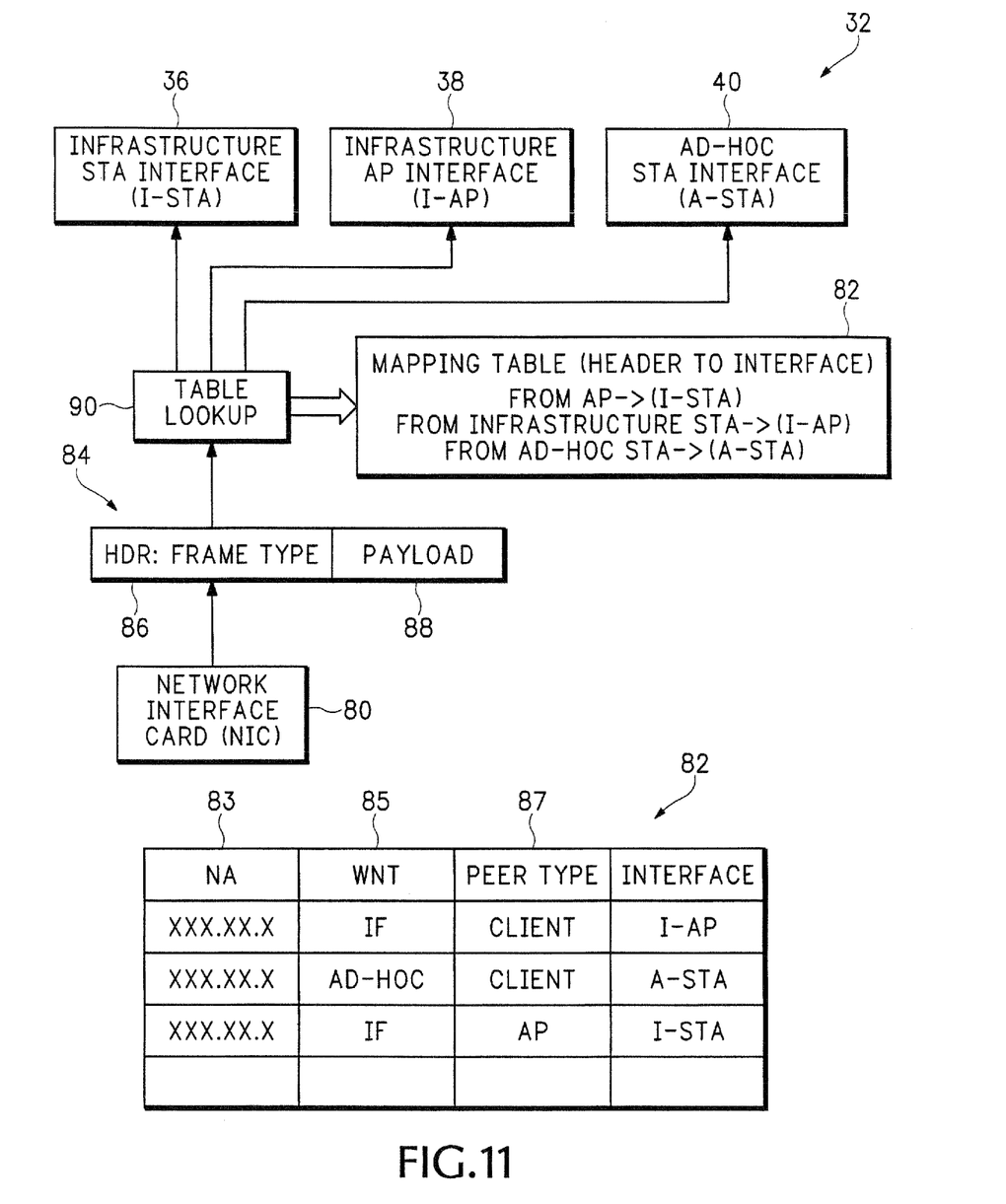
FIG. 11 shows how the GC identifies which virtual interfaces are used for processing data.

FIG. 11 shows the functional operations in a generic client 32 that enable a wireless communication device to utilize a single physical interface card 80, such as an 802.11 wireless transceiver, to simultaneously communicate with peers in ad-hoc, infrastructure, WDS, and any other networks.

A single Network Interface Card (NIC) 80 has trouble communicating with distinct wireless networks, even if the networks operate on the same channel. This is because the infrastructure client, such (as a STA to AP), ad-hoc (as a STA to STA) and infrastructure AP (as an AP to STA) networks require distinct frame headers. In order to overcome this problem, the different wireless networks are represented as virtual network interfaces 36, 38, and 40, which are operating system abstractions.

A table 82 is used to keep track of the different wireless networks and to create a logical mapping between the wireless networks and the virtual interfaces 36, 38, and 40. The table 82 contains the peer's network address 83 (the layer 2, or MAC address), the wireless network type 85 and peer type 87 (infrastructure client, infrastructure server (AP), ad-hoc client).

The NIC 80 receives a frame 84 from the air that includes a header 86 and a payload 88. The header 86 is examined by a table lookup operation 90 to determine the wireless network type 85 and peer type 87. The table lookup 90 determines what type of virtual interface 36, 38, or 40 to use for processing the frame 84 according to the information in the frame header 86. A frame from an infrastructure AP is sent to the infrastructure STA interface (I-STA) 36. A frame received from an infrastructure STA is sent to the infrastructure AP interface (I-AP) 38. A frame from an ad-hoc STA is sent to the ad-hoc STA interface (A-STA) 40.

In the 802.11 example, the table lookup determines what type of frame is received according to the To-DS and From-DS bits as described above in Table 1.0. For example, if the To-DS and the From-DS bits are both set to 0, then the table lookup 90 selects the ad-hoc STA interface 40. When the frame 84 is received with the To DS bit is set to 1 and the From DS bit set to 0, the table lookup uses the I-AP interface. When a frame 84 is received that has the To DS bit set to 0 and the From DS bit set to 1, the table lookup uses the I-STA interface 36. The frame header may then be stripped off and the payload is forwarded via the appropriate interface 36, 38 or 40 via an upper layer routing operation.

The network address 83 associated with the frame is used to distinguish between different virtual interfaces 36, 38, and 40 that may be operating at the same time. For example, there may be two I-AP interfaces 38 operating at the same time communicating with two different infrastructure STA's. The address in the frame is stored in network address 83 in table 82 to identify the particular virtual interface 38 associated with the wireless session.

The TX (transmit) logic works a differently. The virtual network interface by itself provides the appropriate wireless network context so no table lookup is required. Because the operations conducted in the virtual interfaces 36, 38, and 40 are already known, they are not described in further detail.

Hardware Considerations

Figure 12:
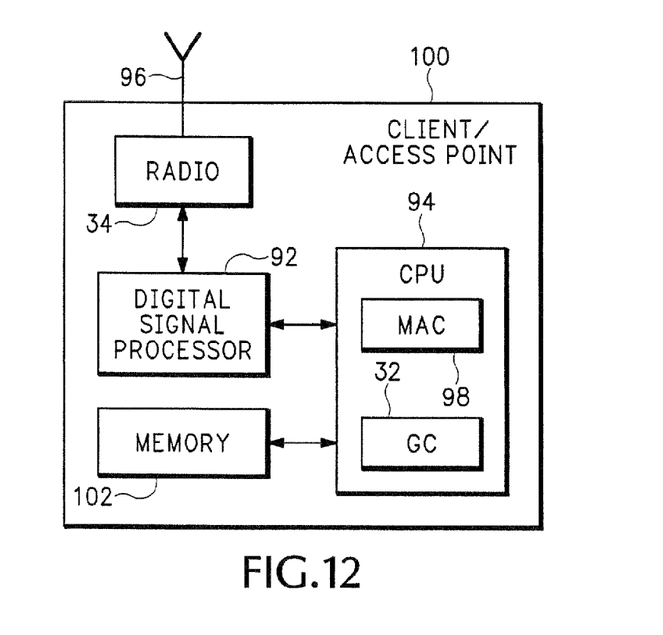
FIG. 12 is a block diagram showing the hardware inside the device that runs the GC.

FIG. 12 shows the general architecture of a device 100 providing the generic client 32 operations. An analog radio 34 is coupled to an antenna 96. A Digital Signal Processor (DSP) 92 is coupled to the radio 34 and a Central Processing Unit (CPU) 94. A media access controller (MAC) 98 may be a separate chip or may be integrated into the CPU 94.

The CPU 94 may operate the AP 20 in software. The generic client 32 may be operated by the CPU 94 and may be part of a Personal Computer (PC), Personal Digital Assistant (PDA), or laptop. With the generic client 32, the CPU 94 may also run the driver software. The software which runs on the DSP 92 and the MAC chip is often called firmware. The firmware is usually written into non-volatile memory 102.

Figure 13:
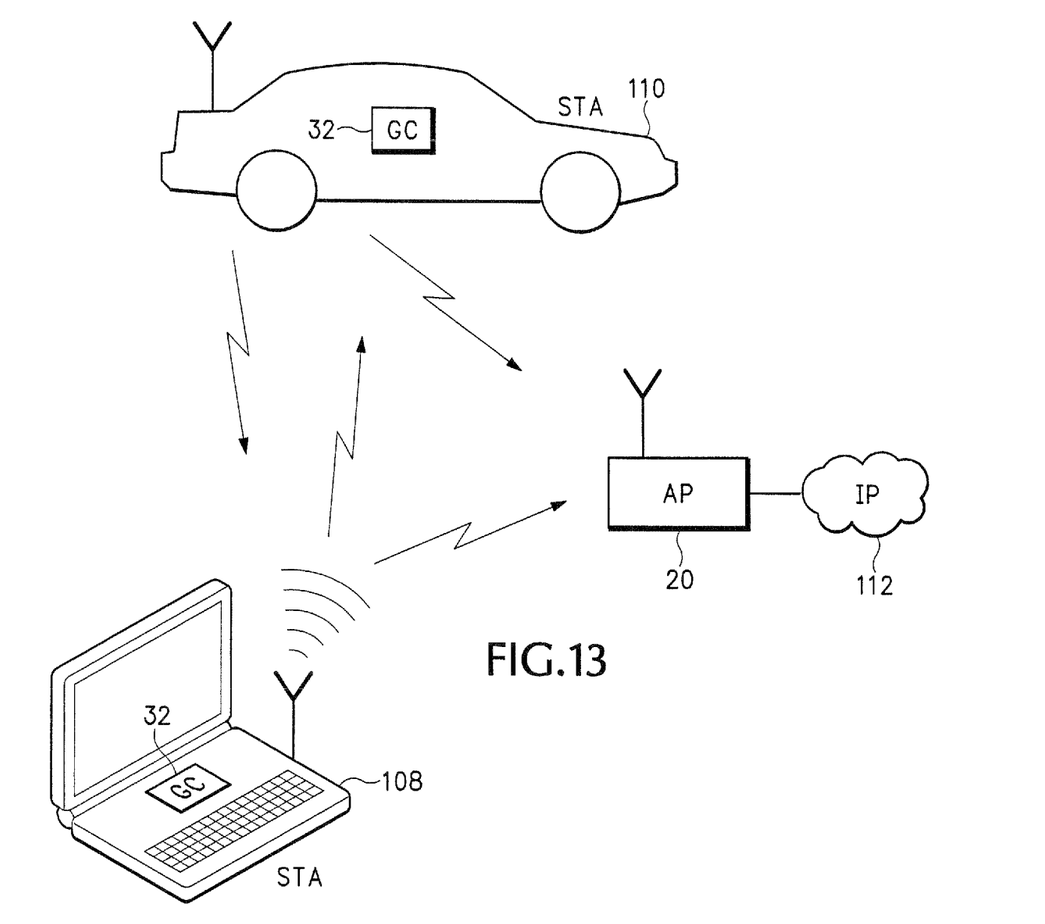
FIG. 13 is a diagram showing devices that may operate the GC.

FIG. 13 shows on example of mobile devices that may serve as a platform for the generic client 32. Typically for 802.11 applications, the GC 32 is operating in some sort of computing device 108, such as a PC, PDA, or laptop. However, for 802.11 or other types of wireless communication protocols, may operate the generic client 32 from other platforms such as a vehicle 110. The access point 20 typically includes routing software or a gateway for transferring data over a network, such as an Internet Protocol (IP) network 112.

The GC can be incorporated into any current or emerging wireless technology including all current and future versions of IEEE 802.11 (also known as 'WiFi'), Bluetooth, and other proprietary wireless protocols. The IEEE 802.11 WiFi specification is located at http://standards.ieee.org/getieee802/802.11.html and is herein incorporated by reference.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A wireless communication device, comprising:
   a physical layer interface configured to facilitate communication over each of a plurality of networks, the plurality of networks comprising a first infrastructure communication network and a first ad-hoc communication network;
   a first station (STA) infrastructure virtual interface configure to communicate with an access point (AP) in the first infrastructure communication network;
   a first AP infrastructure virtual interface configured to communicate with an STA in the first ad-hoc communication network; and
   a second STA infrastructure virtual interface configured to communicate with an STA in a second ad-hoc communication network, the plurality of networks comprising the second ad-hoc communication network, wherein the first STA infrastructure virtual interface, the first AP infrastructure virtual interface, and the second STA infrastructure virtual interface are configured to simultaneously communicate with the AP in the first infrastructure communication network, the STA in the first ad-hoc communication network, and the STA in the second ad-hoc communication network, respectively.

2. The wireless communication device of claim 1, wherein the first STA infrastructure virtual interface and the first AP infrastructure virtual interface are configured to simultaneously communicate with the AP in the first infrastructure communication network and the STA in the first ad-hoc communication network, respectively.

3. The wireless communication device of claim 1, wherein the wireless communication device is configured to determine whether to use the first STA infrastructure virtual interface or the first AP infrastructure virtual interface for a frame based on information in a header of the frame.

4. The wireless communication device of claim 3, wherein the information in the header of the frame includes a "From DS bit" and a To DS bit".

5. The wireless communication device of claim 1, wherein the wireless communication device is configured to determine whether to use the first STA infrastructure virtual interface, the first AP infrastructure virtual interface, or the second STA infrastructure virtual interface for a frame based on information in a header of the frame.

6. The wireless communication device of claim 5, wherein the information in the header of the frame includes a "From DS bit" and a To DS bit".

7. The wireless communication device of claim 1, further comprising:
   a proprietary virtual network interface configured to communicate with a client device in a proprietary network, the plurality of networks comprising the proprietary network.

8. The wireless communication device of claim 7, wherein the first STA infrastructure virtual interface, the first AP infrastructure virtual interface, and the proprietary virtual network interface are configured to simultaneously communicate with the AP in the first infrastructure communication network, the STA in the first ad-hoc communication network, and the client device in the proprietary network, respectively.

9. The wireless communication device of claim 7, wherein the wireless communication device is configured to determine whether to use the first STA infrastructure virtual interface, the first AP infrastructure virtual interface, or the proprietary virtual network interface for a frame based on information in a header of the frame.

10. The wireless communication device of claim 9, wherein the information in the header of the frame includes a "From DS bit" and a To DS bit".

11. The wireless communication device of claim 1, further comprising:
    a wireless distribution system (WDS) interface that allows the first AP infrastructure virtual interface to communicate with another AP.

12. The wireless communication device of claim 1, further comprising a transceiver configured to implement the physical layer interface.

* * * * *